US012256068B2

(12) United States Patent
Robert et al.

(10) Patent No.: US 12,256,068 B2
(45) Date of Patent: Mar. 18, 2025

(54) SIGNALING OF MERGE INDICES FOR TRIANGLE PARTITIONS

(71) Applicant: INTERDIGITAL CE PATENT HOLDINGS, SAS, Paris (FR)

(72) Inventors: Antoine Robert, Mezieres sur Couesnon (FR); Fabrice Leleannec, Betton (FR); Fabrice Urban, Thorigne Fouillard (FR); Ya Chen, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 122 days.

(21) Appl. No.: 17/622,134

(22) PCT Filed: Jul. 2, 2020

(86) PCT No.: PCT/EP2020/068744
§ 371 (c)(1),
(2) Date: Dec. 22, 2021

(87) PCT Pub. No.: WO2021/001514
PCT Pub. Date: Jan. 7, 2021

(65) Prior Publication Data
US 2023/0156190 A1    May 18, 2023

(30) Foreign Application Priority Data

Jul. 3, 2019 (EP) .................................. 19305906

(51) Int. Cl.
*H04N 19/119* (2014.01)
*H04N 19/513* (2014.01)

(52) U.S. Cl.
CPC ......... *H04N 19/119* (2014.11); *H04N 19/513* (2014.11)

(58) Field of Classification Search
CPC .......................... H04N 19/513; H04N 19/119
See application file for complete search history.

(56) References Cited

U.S. PATENT DOCUMENTS

2013/0016788 A1    1/2013    Oh

FOREIGN PATENT DOCUMENTS

| CN | 107071458 A | 8/2017 |
| CN | 107071459 A | 8/2017 |

OTHER PUBLICATIONS

Liao et al, "CE10.3.1.b: Triangular prediction unit mode", Joint Video Exploration Team (JVET) of ITU-T SG16 WP3 and ISO/IEC JTC 1/SC 29WG11, Document: JVET-L0124-v2, 12th Meeting: Macao, China, Oct. 3, 2018, 8 pages.

(Continued)

*Primary Examiner* — On S Mung
(74) *Attorney, Agent, or Firm* — Condo Roccia Koptiw LLP

(57) ABSTRACT

Different implementations are described, particularly implementations for video encoding and decoding are presented. Accordingly, the encoding or decoding comprises obtaining a merging candidate index that enables deriving both a first merging candidate index and a second merging candidate index in a triangular shape based motion compensation candidates list in list in use in a triangular shape based motion compensation. According to a particular characteristic, a mapping function determines the derivation process of both indices among a subset of possible combinations of merge candidate indices.

20 Claims, 5 Drawing Sheets

(56) References Cited

OTHER PUBLICATIONS

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document: JVET-G1001-v1, 7th Meeting, Torino, Italy, Jul. 13, 2017, 48 pages.

Bross et al., "Versatile Video Coding (Draft 5)", Joint Video Experts Team (JVET) of ISO/IEC JTC1/SC29/WG11 and ITU-T SG.16, Document: JVET-N1001-v5, 14th Meeting, Geneva, Switzerland, Mar. 19, 2019, 370 pages.

Wang et al., "Non-CE10: Triangle prediction merge index coding", Joint Video Experts Team (JVET) of ITU-T SG 16 WP 3 and ISO/IEC JTC 1/SC 29/WG 11, Document: JVET-M0234, 13th Meeting, Marrakech, Morocco, Jan. 9, 2019, 4 pages.

Chang et al., "Non-CE4: On triangle merge moders", Joint Video Experts Team (JVET) of ITU-T SG 16 WP 3 and ISO/IEC JTC 1/SC 29/WG 11, Document: JVET-N0447, 14th Meeting, Geneva, Switzerland, Mar. 19, 2019, 4 pages.

Anonymous, "Series H: Audiovisual and Multimedia Systems, Infrastructure of audiovisual services—Coding of moving video—Information Technology—Generic coding of moving pictures and associated audio information: Video". International Telecommunication Union, ITU-T Telecommunication Standardization Sector of ITU, Recommendation ITU-T H.262, Feb. 2000, 220 pages.

Anonymous, "Series H: Audiovisual and Multimedia Systems, Infrastructure of audiovisual services—Coding of moving video—Reference software for ITU-T H.265 high efficiency video coding", International Telecommunication Union, ITU-T Telecommunication Standardization Sector of ITU, Recommendation ITU-T H.265.2, Oct. 2014, 12 pages.

Chen et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11; Document: JVET-N1002-v1, 14th Meeting: Geneva, Switzerland, Mar. 19, 2019, 70 pages.

Anonymous, "Reference Software for ITU-T H.265 High Efficiency Video Coding", Series H: Audiovisual and Multimedia Systems—Infrastructure of audiovisual services—Coding of Moving Video, Telecommunication Standarization Sector of ITU, Recommendation ITU-T H.265.2, Oct. 2014, 12 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

SIGNALING OF MERGE INDICES FOR TRIANGLE PARTITIONS

CROSS REFERENCE TO RELATED APPLICATIONS

This application is a U.S. National Stage Application under 35 U.S.C. 371 of International Patent Application No. PCT/EP2020/068744, filed Jul. 2, 2020, which is incorporated herein by reference in its entirety.

This application claims priority to European Patent Application No. 19305906, filed Jul. 3, 2019.

TECHNICAL FIELD

At least one of the present embodiments generally relates to, e.g., a method or an apparatus for video encoding or decoding, and more particularly, to a method or an apparatus comprising signaling a single merging candidate index that enables deriving a first merging candidate index and a second merging candidate index in a triangular shape based motion compensation candidates list in use in a triangular shape based motion compensation.

BACKGROUND

The domain technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services-coding of moving video, High efficiency video coding, Recommendation ITU-T H.265"), or compared to under development video compression systems such VVC (Versatile Video Coding, a new standard being developed by JVET, the Joint Video Experts Team).

In particular, at least some embodiments further relate to improving the video compression efficiency in terms of bitrate saving or complexity reduction by modifying the signaling of triangle partition mode which will be used for inter prediction.

SUMMARY

The purpose of the invention is to overcome at least one of the disadvantages of the prior art. For this purpose, according to a general aspect of at least one embodiment, a method for decoding is presented. The decoding method comprises decoding a syntax element representative of a merging candidate index of a triangular shape based motion compensation candidate list; and decoding a block of a picture by performing a triangular shape based motion compensation using motion information of a merging candidate at a position indicated by a first merging candidate index in the motion compensation candidate list and of a merging candidate at a position indicated by a second merging candidate index in the motion compensation candidate list. According to a particular characteristic, the method further comprises deriving a first merging candidate index and a second merging candidate index in the triangular shape based motion compensation candidates list from the decoded syntax element. Thus, the method limits the signaling and reduces the number of bits used to signal 2 indices for the merge candidates.

According to another general aspect of at least one embodiment, a method for encoding is presented. The encoding method comprises encoding a block of a picture by performing a triangular shape based motion compensation using motion information of a merging candidate at a position indicated by the first merging candidate index in the motion compensation candidate list and of a merging candidate at a position indicated by the second merging candidate index in the motion compensation candidate list. According to a particular characteristic, a merging candidate index is determined wherein the merging candidate index enables deriving a first merging candidate index and a second merging candidate index in the triangular shape based motion compensation candidates list, thus the encoding method further comprises encoding a syntax element representative of the merging candidate index of a triangular shape based motion compensation candidate list. Thus, the method limits the signaling and reduces the number of tested combinations and thus the encoder complexity.

According to another general aspect of at least one embodiment, a mapping function determines the deriving of a first merging candidate index and a second merging candidate index from the merging candidate index.

According to another general aspect of at least one embodiment, the merging candidate index is the first merging candidate index in the triangular shape based motion compensation candidates list; and the second merging candidate index is derived from the first merging candidate index. Accordingly, the mapping function determines one of the second merging candidate index is set to one in case the first merging candidate index is equal to zero else the second merging candidate index is set to zero; or the second merging candidate index is set to one in case the first merging candidate index is equal to zero else the second merging candidate index is set to half the first merging candidate index.

According to another general aspect of at least one embodiment, a syntax element indicates whether the merging candidate index is the first merging candidate index or the second merging candidate index; and the second merging candidate index is derived from the first merging candidate index in case the syntax element indicates the merging candidate index is the first merging candidate index or the first merging candidate index is derived from the second merging candidate index in case the syntax element indicates the merging candidate index is the second merging candidate index. Accordingly, in case the syntax element indicates the merging candidate index is the first merging candidate index, the mapping function determines one of the second merging candidate index is set to one in case the first merging candidate index is equal to zero else the second merging candidate index is set to zero; the second merging candidate index is set to one in case the first merging candidate index is equal to zero else the second merging candidate index is set to half the first merging candidate index.

According to another general aspect of at least one embodiment, a range of the merging candidate index is larger than the range of the triangular shape based motion compensation candidate list and less than twice the range of the triangular shape based motion compensation candidate list. Thus, the mapping function determines one of the first merging candidate index is set to zero and the second merging candidate index is set to one in case the merging candidate index is equal to zero; the first merging candidate index is set to the merging candidate index and the second merging candidate index is set to zero in case the merging candidate index is greater than zero and less than the range of the triangular shape based motion compensation candidate list; else the first merging candidate index is set to the merging candidate index minus the range of the triangular shape based motion compensation candidate list and the second merging candidate index is set to first merging candidate index plus an offset.

According to another general aspect of at least one embodiment, the merging candidate index of a triangular shape based motion compensation candidate list further indicates one of a split direction of a diagonal boundary or an angle and a distance of a slanted boundary.

According to another general aspect of at least one embodiment, an apparatus for encoding is presented comprising means for implementing any one of the embodiments of the encoding methods. According to another general aspect of at least one embodiment, an apparatus for decoding is presented comprising means for implementing any one of the embodiments of the decoding methods.

According to another general aspect of at least one embodiment, an apparatus for encoding is provided, comprising one or more processors, and at least one memory. The one or more processors is configured to implement any one of the embodiments of the encoding methods.

According to another general aspect of at least one embodiment, an apparatus for decoding is provided, comprising one or more processors and at least one memory. The one or more processors is configured to implement any one of the embodiments of the decoding methods.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of a picture. They may be applied to encode/decode a part of picture, such as a slice or a tile, or a whole sequence of pictures. Besides, various embodiments are described with respect to the decoding of blocks (for example a coding unit CU) and are easily derived to the coding of blocks.

Various methods are described above, and each of the methods comprises one or more steps or actions for achieving the described method. Unless a specific order of steps or actions is required for proper operation of the method, the order and/or use of specific steps and/or actions may be modified or combined.

Figure 1:
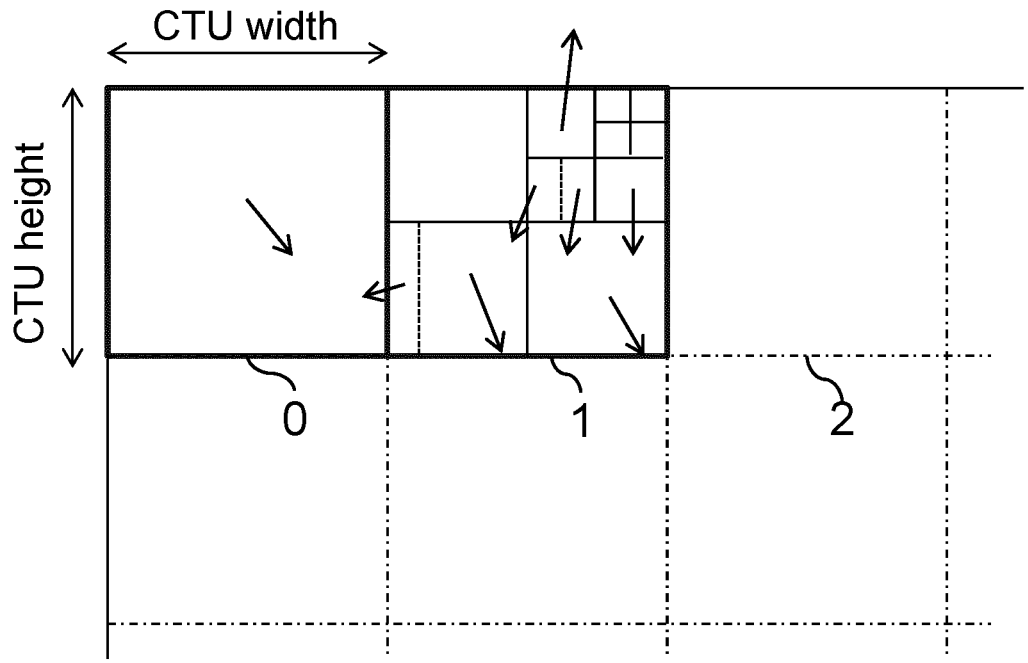
FIG. 1 illustrates an example of Coding Tree Unit (CTU) and Coding Tree (CT) concepts to represent a compressed HEVC picture.
Figure 2:
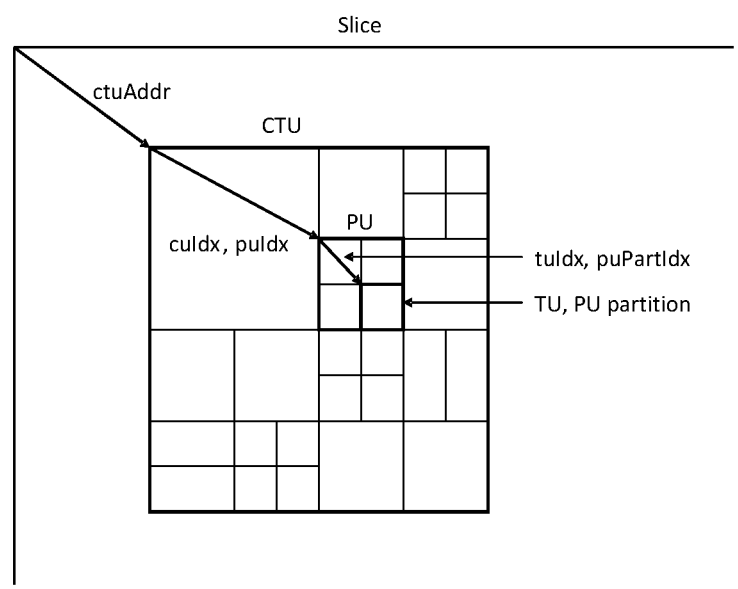
FIG. 2 illustrates an example of division of a Coding Tree Unit into Coding Units, Prediction Units and Transform Units.

In the HEVC video compression standard, a picture is divided into so-called Coding Tree Units (CTU), which size is typically 64×64, 128×128, or 256×256 pixels. FIG. 1 illustrates an example of Coding Tree Unit (CTU) and Coding Tree (CT) concepts to represent a compressed HEVC picture. Each CTU is represented by a Coding Tree in the compressed domain. This is a quad-tree division of the CTU, where each leaf is called a Coding Unit (CU) as illustrated on FIG. 1. Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, as shown on FIG. 2. Exactly one Motion Vector is assigned to each PU in HEVC. This motion vector is used for motion compensated temporal prediction of the considered PU. Therefore, in HEVC, the motion model that links a predicted block and its reference block simply consists in a translation.
Limitation of Triangle Partition Signaling in Latest Development of VVC In VVC, a geometric partition mode (GPM) is supported for inter prediction. The geometric partition mode allows handling slanted motion boundaries in a CU. The geometric partition is an extension of a triangle partition mode (TPM) where angle and position of the slanted boundary between 2 partitions are configurable. The geometric partition mode is only applied to CUs that are 8×8 or larger. The geometric partition mode is derived at CU-level as the remaining merge mode after the other merge modes including the regular merge mode, the MMVD mode, the subblock merge mode and the CIIP mode. In the following, the present principles are described for triangle partition mode for better understanding of the reader, however the at least one embodiment will be non-ambiguously derived for similar partition mode raising the same technical issue such as geometric partition mode.

Figure 3A:
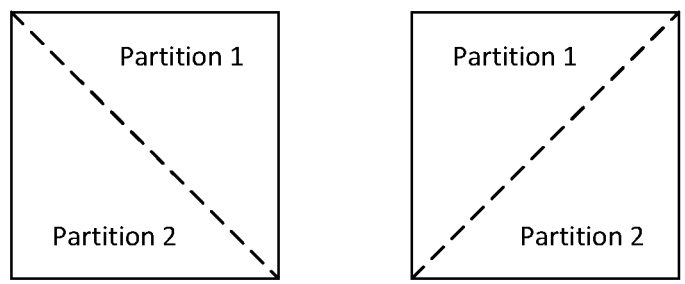
FIG. 3a illustrates an example of a triangle partition of a coding unit for inter prediction.

FIG. 3a illustrates an example of a triangle partition mode of a coding unit for inter prediction. When the triangle partition mode is used, a CU is split evenly into two triangle-shaped partitions (partition 1, partition 2), using either the diagonal split or the anti-diagonal split as shown on FIG. 3a. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated predictions are needed for each CU. The uni-prediction motion for each partition is derived using the process described below.

If triangle partition mode is used for a current CU, then a flag indicating the direction of the triangle partition (diagonal or anti-diagonal), and two merge indices (one for each partition) are further signaled as described below. The number of maximum TPM candidates is signaled explicitly at slice level and specifies syntax binarization for TMP merge indices. After predicting each of the triangle partitions, the sample values along the diagonal or anti-diagonal edge are adjusted using a blending processing with adaptive weights. This is the prediction signal for the whole CU, then transform and quantization process will be applied to the whole CU as in other prediction modes. Finally, the motion field of a CU predicted using the triangle partition mode is stored in 4×4 units.

Figure 3B:
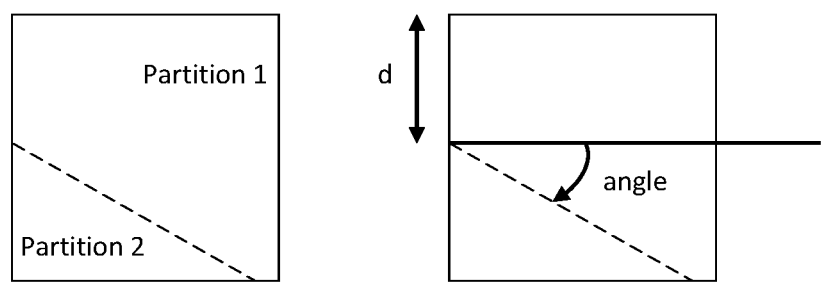
FIG. 3b illustrates an example of a geometric partition of a coding unit for inter prediction.

FIG. 3b illustrates an example of a geometric partition mode of a coding unit for inter prediction. When the geometric partition mode is used, a CU is split evenly into two partitions (partition 1, partition 2) along a slanted boundary. One of the partitions (partition 2) is a triangle-shaped partition. The angle (angle) and position (d) of the slanted boundary are configurable.

Figure 4:
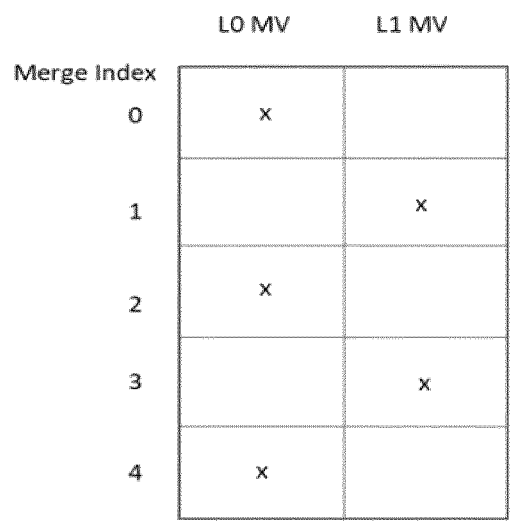
FIG. 4 illustrates an example of selection of Uni-prediction motion vector for triangle partition mode used in inter prediction.

FIG. 4 illustrates an example of selection of Uni-prediction motion vector for triangle partition mode used in inter prediction. The selection of 2 uni-prediction motion vectors is performed in same way for geometric partitions in VVC. The uni-prediction candidate list is derived directly from the merge candidate list constructed according to the extended merge prediction process. Denote n as the index of the uni-prediction motion in the triangle uni-prediction candidate list. The LX motion vector of the n-th extended merge candidate, with X equal to the parity of n, is used as the n-th uni-prediction motion vector for triangle partition mode. These motion vectors are marked with "x" in FIG. 4. In case a corresponding LX motion vector of the n-the extended merge candidate does not exist, the L(1−X) motion vector of the same candidate is used instead as the uni-prediction motion vector for triangle partition mode There are up to 5 uni-prediction candidates and an encoder has to test all the combinations of candidates (one for each partition) in the 2 splitting directions. Therefore, the maximum number of tested combinations is 40 (5*4*2) with a maximum number of triangle merge candidates set to 5 and all combinations tested (where MaxNumTriangleMergeCand=5 and nb_combinations=MaxNumTriangleMergeCand* (MaxNumTriangleMergeCand−1)*2).

Regarding the signaling and as described above, the triangle partition mode needs to signal (i) a binary flag indicating the direction of the triangle partition, and (ii) two merge indices after deriving whether the triangle partition mode is used or not.

In the following are presented parts of a version of VVC specification where the triangle partition signaling is involved (in bold). Advantageously, the current derivation process for luma motion vectors for merge triangle mode allow to save bits by not coding the case where n is equal to m which should not occur. The VVC version indented below and asterisks added where highlighted with bold in applicant's originally filed disclosure:

| 7.3.7.7 Merge data syntax | |
|---|---|
| | Descriptor |
| merge_data( x0, y0, cbWidth, cbHeight ) { | |
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag | | cbWidth * cbHeight != 32 ) | |
|       regular_merge_flag[ x0 ][ y0 ] | ae(v) |
|     if ( regular_merge_flag[ x0 ][ y0 ] = = 1 ) { | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && | |
|             ( cbWidth * cbHeight ) >= 64 && cbWidth < 128 && cbHeight < | |

7.3.7.7 Merge data syntax

| | Descriptor |
|---|---|
| 128 ) { | |
|     ciip_flag[ x0 ][ y0 ] | ae(v) |
|     if( ciip_flag[ x0 ][ y0 ] && MaxNumMergeCand > 1 ) | |
|       merge_idx[ x0 ][ y0 ] | ae(v) |
|     } | |
|    if( MergeTriangleFlag[ x0 ][ y0 ] ) { | |
|     merge_triangle_split_dir[ x0 ][ y0 ] | ae(v) |
|     merge_triangle_idx0[ x0 ][ y0 ] | ae(v) |
|     merge_triangle_idx1[ x0 ][ y0 ] | ae(v) |
|    } | |
|   } | |
|  } | |
|  } | |
| } | |

7.4.8.7 Merge data semantics

...

The variable MergeTriangleFlag[x0][y0], which specifies whether triangular shape based motion compensation is used to generate the prediction samples of the current coding unit, when decoding a B slice. is derived as follows:

If all the following conditions are true, MergeTriangleFlag[x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
mmvd_merge_flag[x0][y0] is equal to 0.
merge_subblock_flag[x0][y0] is equal to 0.
ciip_flag[x0][y0] is equal to 0.
Otherwise, MergeTriangleFlag[x0][y0] is set equal to 0.
merge_triangle_split_dir[x0][y0] specifies the splitting direction of merge triangle mode. The array indices x0, y0 specify the location (x0, y0) of the top-left luma sample of the considered coding block relative to the top-left luma sample of the picture.
When merge_triangle_split_dir[x0][y0] is not present, it is inferred to be equal to 0.
merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.
When merge_triangle_idx0[x0][y0] is not present, it is inferred to be equal to 0.
merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.
When merge_triangle_idx1[x0][y0] is not present, it is inferred to be equal to 0.

...

8.5.4.2 Derivation process for luma motion vectors for merge triangle mode

...

The motion vectors mvA and mvB, the reference indices refIdxA and refIdxB and the prediction list flags predListFlagA and predListFlagB are derived by the following ordered steps:

1. The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the bi-prediction weight index bowIdx and the merging candidate list mergeCandList.

2. * The variables m and n, being the merge index for triangle partition 0 and 1 respectively, are derived using merge_triangle_idx0 [xCb][yCb] and merge_triangle_idx1 [xCb][yCb] as follows:

$$m = \text{merge\_triangle\_}idx0[xCb][yCb] \quad (8\text{-}447)$$

$$n = \text{merge\_triangle\_}idx1[xCb][yCb] + (\text{merge\_triangle\_}idx1[xCb][yCb] >= m)?1:0 \quad (8\text{-}448)$$

3 ...

TABLE 9-11

Syntax elements and associated binarizations
(where FL: Fixed-Length coding, TR: Truncated Rice coding, . . . )

| | | Binarization | |
|---|---|---|---|
| Syntax structure | Syntax element | Process | Input parameters |
| merge_data( ) | regular_merge_flag[ ][ ] | FL | cMax = 1 |
| | mmvd_merge_flag[ ][ ] | FL | cMax = 1 |

TABLE 9-11-continued

Syntax elements and associated binarizations
(where FL: Fixed-Length coding, TR: Truncated Rice coding, . . . )

| Syntax structure | Syntax element | Binarization Process | Input parameters |
|---|---|---|---|
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_split_dir[ ][ ] | FL | cMax = 1 |
| | merge_triangle_idx0[ ][ ] | TR | cMax = MaxNumTriangleMergeCand − 1, cRiceParam = 0 |
| | merge_triangle_idx1[ ][ ] | TR | cMax = MaxNumTriangleMergeCand − 2, cRiceParam = 0 |
| | merge_idx[ ][ ] | TR | cMax = MaxNumMergeCand − 1, cRiceParam = 0 |
| | . . . | . . . | . . . |

TABLE 9-17

Assignment of ctxInc to syntax elements with context coded bins
(where bypass stands for no contexts and equiprobability)

| Syntax element | binIdx | | | | | |
|---|---|---|---|---|---|---|
| | 0 | 1 | 2 | 3 | 4 | >=5 |
| . . . | . . . | . . . | . . . | . . . | . . . | . . . |
| merge_subblock_flag[ ][ ] | 0, 1, 2 (clause 9.5.4.2.2) | na | na | na | na | na |
| merge_subblock_idx[ ][ ] | 0 | bypass | bypass | bypass | bypass | na |
| ciip_flag[ ][ ] | 0 | na | na | na | na | na |
| merge_idx[ ][ ] | 0 | bypass | bypass | bypass | bypass | na |
| * merge_triangle_split_dir[ ][ ] | bypass | na | na | na | na | na |
| merge_triangle_idx0[ ][ ] | 0 | bypass | bypass | bypass | bypass | na |
| merge_triangle_idx1[ ][ ] | 0 | bypass | bypass | bypass | na | na * |
| . . . | . . . | . . . | . . . | . . . | . . . | . . . |

It is desirable to simplify the triangle partition mode signaling that currently consists in a flag (merge_triangle_split_dir[ ][ ]) followed by two indices (merge_triangle_idx0[ ][ ], merge_triangle_idx1[ ][ ]) per CU using the triangle partition mode. Although in VVC the geometric partition mode signaling is adapted to indicate the angle and the distance of the slanted boundary, the signaling of two indices of merge candidate remains the same as the one presented for triangle partition mode. Indeed a syntax element merge_gpm_partition_idx[x0][y0] replaces the binary syntax element merge_triangle_split_dir[x0][y0]. The syntax element merge_gpm_partition_idx[x0][y0] indicates the angle and position of the geometric portioning mode. Then, the merging candidate indexes stay identical (except their names). Therefore, a simplification of the merge indices is also desirable for VVC and for any standard that would implement such type of partition in inter merge mode.

At least one main embodiment relates to a method for signaling triangle partition for Inter prediction. At least one embodiment further relates to a method for encoding/decoding a video comprising signaling of triangle partition for Inter prediction according to any of the disclosed methods. At least one embodiment relates to a method comprising obtaining a syntax element representative of a merging candidate index of a triangular shape based motion compensation candidate list; deriving a first merging candidate index and a second merging candidate index in the triangular shape based motion compensation candidates list from the decoded syntax element; and performing a triangular shape based motion compensation using motion information of a merging candidate at a position indicated by the first merging candidate index in the motion compensation candidate list and of a merging candidate at a position indicated by the second merging candidate index in the motion compensation candidate list. In the present application, the terms "triangular shape-based motion compensation" refers to a motion compensation along a slanted boundary in a square or rectangle block shape. Thus, the term "triangular shape-based motion compensation" and "geometric shape-based motion compensation" may be used interchangeably.

At least one embodiment comprises deriving one of the indices from the other. Advantageously, the at least one embodiment limits the signaling and reduces the number of tested combinations and thus the encoder complexity. In a first variant, one of the index (for instance merge_triangle_idx1[ ][ ]) is not signaled, and this index (for instance merge_triangle_idx1[ ][ ]) is derived from the signaled one (for instance merge_triangle_idx0[ ][ ]). In a second variant, one of the index (for instance merge_triangle_idx1[ ][ ]) is not signaled, a flag indicating which index is transmitted (for instance 0 to indicate merge_triangle_idx0[ ][ ] is transmitted and 1 to indicate merge_triangle_idx1[ ][ ] is transmitted) is signaled, the index not signaled is also derived from the signaled (transmitted) one. In a third variant, at least one embodiment comprises extending the signaled index to support more combinations of candidates. In a fourth variant, at least one embodiment comprises replacing all signaling by one single index representing the splitting direction and the triangle merge candidate indices.

In the following sections, embodiments of a method for decoding using a triangle partition mode used in inter prediction according to different embodiments are described. Corresponding embodiments of an encoding method are also described.

At Least One Main Embodiment of a Method for Decoding or Encoding that Performs a Triangular Shape-Based Motion Compensation.

In the following, the two uni-prediction candidates of a triangular CU, one for each triangle partition, are denoted $Cand_0$ and $Cand_1$ respectively.

Each of these uni-prediction candidates, $Cand_x$, corresponds to a merge_triangle_idx$_x$, denoted idx$_x$, and is associated with a motion vector mv$_x$ and its reference frame of index refidx$_x$ over reference picture list $L_y$ (where y is given by the parity of the index idx$_x$).

Figure 5:
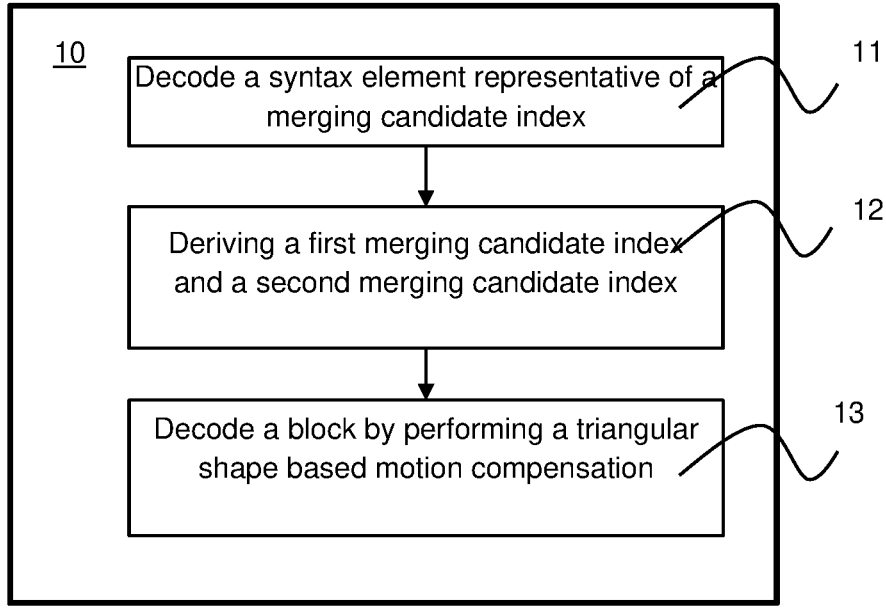
FIG. 5 illustrates an example of a decoding method according to a general aspect of at least one embodiment.

FIG. 5 illustrates an example of a decoding method according to a general aspect of at least one embodiment. In the following, the different embodiments for signaling/deriving merging candidate indices of a triangular shape-based motion compensation candidate list are described for a decoding method, but the present principles will be easily derived for an encoding method by the skilled in the art. Thus, the method 10 for decoding a block (for example the Coding Unit CU using a TPM) in a picture comprises, in a step 11, decoding a syntax element representative of a merging candidate index of a triangular shape-based motion compensation candidate list. Then, in a step 12, a first merging candidate index $idx_0$ and a second merging candidate index $idx_1$ in the triangular shape based motion compensation candidates list are derived from the decoded syntax element. Indeed, a mapping function allows deriving the first merging candidate index, and the second merging candidate index from the merging candidate index. In the following various non-limiting examples of a mapping function are described along with the different variants. Advantageously, the derivation process of merge triangle candidate indices allow to save bits by not coding the case where both indices are equal which should not occur, otherwise no rational for partitioning. Then, in a step 13, the block of samples is decoded by performing a triangular shape based motion compensation using motion information of a merging candidate $Cand_0$ at a position indicated by the first merging candidate index $idx_0$ in the motion compensation candidate list $L_y$, and of a merging candidate $Cand_1$ at a position indicated by the second merging candidate index $idx_1$ in the motion compensation candidate list $L_y$.

Figure 6:
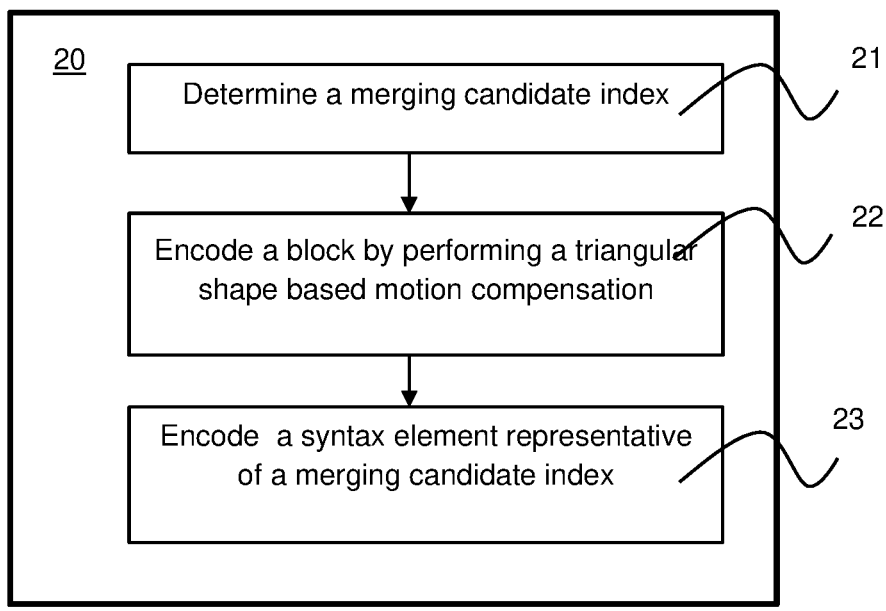
FIG. 6 illustrates an example of an encoding method according to a general aspect of at least one embodiment.

FIG. 6 illustrates an example of an encoding method according to a general aspect of at least one embodiment. The method 20 for encoding a block of samples (for example the Coding Unit CU using a TPM) in a picture comprises, in a step 21, determining a merging candidate index of a triangular shape based motion compensation candidate list wherein the merging candidate index enables deriving a first merging candidate index and a second merging candidate index in the triangular shape based motion compensation candidates list. Indeed, as above, the mapping function, common to decoder and encoder, allows deriving the first merging candidate index and the second merging candidate index from the merging candidate index. Advantageously, the derivation process of merge triangle candidate indices allow to save bits by not coding the case where both indices are equal. Besides, the derivation process advantageously allow to reduce the number of tested combinations for merge candidates at the encoding, thus reducing encoder complexity. The skilled in the art will appreciate that, during the encoding process, possible combinations for merge candidates $Cand_0$ and $Cand_1$ allowed by mapping function, are all tested. Here, only a subset of candidate pairs is tested with the present principles compared to a full search. This is even more effective with geometric partitioning wherein more than 2 (diagonal or anti-diagonal) partitioning schemes are possible. In brief, a triangular shape based motion compensation using one of the possible combinations for merge candidates from the merging index is determined as an encoding mode of the block of samples during the encoding process. Then, in the step 22 the block of samples is encoded by performing a triangular shape based motion compensation using motion information of a merging candidate $Cand_0$ at a position indicated by the first merging candidate index $idx_0$ in the motion compensation candidate list $L_y$, and of a merging candidate $Cand_1$ at a position indicated by the second merging candidate index $idx_1$ in the motion compensation candidate list $L_y$. Finally, in a step 23, a syntax element representative of the merging candidate index of a triangular shape based motion compensation candidate list is also encoded for a decoder.

In the following, non-limiting examples of a mapping function for deriving both merging candidate indices are described.

First Variant: Remove One Signaled Index and Deriving One of the Indices from the Other At least one main embodiment of a method for signaling triangle partition for Inter prediction comprises signaling a first index (for instance merge_triangle_idx0[ ][ ]) of a uni-prediction candidate in a list of uni-prediction candidates and deriving a second index of a uni-prediction candidate (for instance merge_triangle_idx1[ ][ ]) from the signaled first index. Thus, the second index is implicitly decoded (or derived) from the signaled first index. The deriving of one of the uni-prediction candidate index from the other uni-prediction candidate index is compatible with any pre-defined mapping scheme between first and second index and not limited to the examples described hereafter.

Thus, in order to reduce the signaling of the triangle merge mode, it is possible to remove the signaling of one index by deriving one of the indices $idx_x$ from the other $idx_{1-x}$. In that case, only one of the two indices has to be signaled.

In the following, two non-limiting examples of derivation of $idx_1$ from $idx_0$ with $idx_0$ signaled, but the skilled in the art will non-ambiguously apply any of the described methods to derive $idx_0$ from $idx_1$ with $idx_1$ signaled.

Table 3 illustrates 2 two non-limiting examples of mapping between $idx_0$ and $idx_1$ used in the derivation of $idx_1$ from $idx_0$.

A first example of derivation process of $idx_1$ from $idx_0$ is represented by the X in Table 3:

(i) If $idx_0$ is 0, then $idx_1$ is set to 1, (ii) And if $idx_0$ is greater than 0, then $idx_1$ is set to 0.

This mapping is coded by the mapping function: n=(m>0)? 0:1 where the variables m=$idx_0$ and n=$idx_1$ are the merge index for triangle partition 0 and 1 respectively.

A second example of derivation process of $idx_1$ from $idx_0$ is represented by the O in Table 3:

(i) $idx_1$ is set to half of $idx_0$ with $idx_0 \neq idx_1$ (i.e.: 0→1, 1→0, 2→1, 3→1, 4→2).

TABLE 3

Table 3 is a mapping between idx0 and idx1

|  |  | idx₀ | | | | |
|---|---|---|---|---|---|---|
|  |  | 0 | 1 | 2 | 3 | 4 |
| idx₁ | 0 | / | XO | X | X | X |
|  | 1 | XO | / | O | O |  |
|  | 2 |  |  | / |  | O |
|  | 3 |  |  |  | / |  |
|  | 4 |  |  |  |  | / |

(X: first example of derivation, O: second example of derivation to half).

Any other mapping that associates a value to $idx_1$ depending on $idx_0$ except the same value of $idx_0$ is compatible with the present principles.

Furthermore, by deriving one single index $idx_x$ from the other, it reduces the maximum number of tested combinations at the encoder. It goes from 40 combinations (5*4*2 as explained above in the limitation section) to only 10 combinations (5*2=MaxNumTriangleMergeCand*2), thus reducing the encoder complexity in terms of number of iterations of rate distortion optimization loop.

In a variant, the mapping is normative and known by the decoder. According to other variants, the mapping is signaled to the decoder. Thus, in a variant, the mapping table/function is signaled in a slice/tile header indicating that all Luma CUs in the slice/tile use this TPM derivation method. In another variant, the mapping table/function is signaled in the Picture Parameter Set (PPS) indicating that all Luma CUs in a frame use this TPM derivation method. In yet another variant, the mapping table/function is signaled the Sequence Parameter Set (SPS) indicating that all Luma CUs in the sequence use this TPM derivation method.

An example of amendments to VVC specification where the triangle partition signaling is involved (highlighted by single asterisks) is presented below (with double brackets for the removals and double asterisks for the additions) for instance for the first mapping example (n=(m>0)?0:1), the WVC version indented below (for clarity, refer to marking in applicant's originally filed disclosure):

7.4.8.7 Merge Data Semantics

. . .

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture. When merge_triangle_idx0[x0][y0] is not present, it is inferred to be equal to 0.

[merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.]

. . .

8.5.4.2 Derivation Process for Luma Motion Vectors for Merge Triangle Mode

. . .

The motion vectors mvA and mvB, the reference indices refIdxA and refIdxB and the prediction list flags predListFlagA and predListFlagB are derived by the following ordered steps:

1. The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and pred- 7.3.7.7 Merge data syntax

| | Descriptor |
|---|---|
| merge_data( x0, y0, cbWidth, cbHeight ) { | |
|   if(CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
| . . . | . . . |
|     } else { | |
|       if( sps_ciip_enabled_flag  &&  cu_skip_flag[ x0 ][ y0 ]  = =  0  && | |
|         ( cbWidth * cbHeight) >= 64  &&  cbWidth < 128  &&  cbHeight < 128 | |
| ) | |
| { | |
|         ciip_flag[ x0 ][ y0 ] | ae(v) |
|         if( ciip_flag[ x0 ][ y0 ]  &&  MaxNumMergeCand > 1 ) | |
|           merge_idx[ x0 ][ y0 ] | ae(v) |
|       } | |
|       * if( MergeTriangleFlag[ x0 ][ y0 ] ) { | |
|         merge_triangle_split_dir[ x0 ][ y0 ] | ae(v) |
|         merge_triangle_idx_num [ x0 ][ y0 ] | ae(v) * |
|       } | |
|     } | |
|   } | |
|   } | |
| } | |

FlagL1[0][0], the bi-prediction weight index bcwIdx and the merging candidate list mergeCandList.

2. * The variables m and n, being the merge index for triangle partition 0 and 1 respectively, are derived using merge_triangle_idx0[xCb][yCb][[and merge_triangle_idx1[xCb][yCb]]] as follows:

$$m = \text{merge\_triangle\_}idx0[xCb][yCb] \quad (8\text{-}447)*$$

$$[n = \text{merge\_triangle\_}idx1[xCb][yCb] + (\text{merge\_triangle\_}idx1[xCb][yCb] >= m)?1:0 \quad (8\text{-}448)]*$$

$$n = (m>0)?0:1 \quad (8\text{-}448)$$

3 . . .

TABLE 9-11

Syntax elements and associated binarizations
(where FL: Fixed-Length coding, TR: Truncated Rice coding, . . . )

| Syntax structure | Syntax element | Binarization Process | Input parameters |
|---|---|---|---|
| merge_data( ) . . . | | . . . | . . . |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | *merge_triangle_split_dir[ ][ ] | FL | cMax = 1 |
| | merge_triangle_idx0[ ][ ] | TR | cMax = MaxNumTriangleMergeCand − 1, cRiceParam = 0 * |
| | merge_idx[ ][ ] | TR | cMax = MaxNumMergeCand − 1, cRiceParam = 0 |

TABLE 9-17

Assignment of ctxInc to syntax elements with context coded bins
(where bypass stands for no contexts and equiprobability)

| | binIdx | | | | | |
|---|---|---|---|---|---|---|
| Syntax element | 0 | 1 | 2 | 3 | 4 | >=5 |
| . . . | . . . | . . . | . . . | . . . | . . . | . . . |
| merge_idx[ ][ ] | 0 | bypass | bypass | bypass | bypass | na |
| merge_triangle_split_dir[ ][ ] | bypass | na | na | na | na | na |
| merge_triangle_idx0[ ][ ] | 0 | bypass | bypass | bypass | bypass | na * |
| . . . | . . . | . . . | . . . | . . . | . . . | . . . |

Second Variant: Replace One Signaled Index by a Flag Indicating the Signaled Index and Deriving One of the Indices from the Other At least one main embodiment of a method for signaling triangle partition for Inter prediction comprises signaling a flag indicating which index is signaled (for instance merge_triangle_idx_num 0 to indicate merge_triangle_idx0[ ][ ] is signaled and 1 to indicate merge_triangle_idx1[ ][ ] is signaled), signaling a first index (merge_triangle_idx[ ][ ]) of a uni-prediction candidate in a list of uni-prediction candidates and deriving a second index ($idx_{1-x}$) of a uni-prediction candidate from the signaled first index ($idx_x$). As for the first variant, the second index ($idx_{1-x}$) is implicitly decoded (or derived) from the signaled first index ($idx_x$), but this second variant further allows an increased number of pairs of candidates. The deriving of one of the uni-prediction candidates index from the other uni-prediction candidates index is compatible with any pre-defined mapping scheme between 2 indices and not limited to the examples described hereafter with tables 6 and 7.

As merging candidate index is signaled at CU level, the added flag should also be signaled at CU level. However, according to further non-limiting examples, the flag is signaled at a upper level (as slice level or picture level, . . . ) for an entire slice/picture.

Accordingly, an order to reduce the signaling of the triangle merge mode, it is possible to replace the signaling of one index by a flag indicating which index $idx_x$ is signaled thus defining the derivation process of the other index $idx_{1-x}$. In that case, only one of the two indices and a flag have to be signaled.

The signaled flag, denoted merge_triangle_idx_num, indicates the number (x) of the following signaled index $idx_x$. If $idx_0$ is signaled, then $idx_1$ has to be derived from $idx_0$, otherwise this is $idx_0$ that has to be derived from $idx_1$. This flag can be context based or bypassed CABAC coded.

Table 6 illustrates a non-limiting example of mapping between $idx_x$ and $idx_{1-x}$ used in the derivation of $idx_{1-x}$ from $idx_x$ where X' on table 6 represents the case where merge_triangle_idx_num is 0 and O represents the case where merge_triangle_idx_num is 1.

(i) If merge_triangle_idx_num is 0 (i.e. $idx_0$ is signaled)

a. If $idx_0$ is 0, then $idx_1$ is set to 1, b. and if $idx_0$ is greater than 0, then $idx_1$ is set to 0.

(ii) If merge_triangle_idx_num is 1 (i.e. $idx_1$ is signaled)

a. $idx_0$ is set to 0 and $idx_1$ is set to $idx_1+2$.

TABLE 6

Table 6 is a mapping between idx0 and idx1

|  |  | $idx_0$ | | | | |
|---|---|---|---|---|---|---|
|  |  | 0 | 1 | 2 | 3 | 4 |
| $idx_1$ | 0 | / | X | X | X | X |
|  | 1 | X | / |  |  |  |
|  | 2 | O |  | / |  |  |
|  | 3 | O |  |  | / |  |
|  | 4 | O |  |  |  | / |

(X: idx1 from signaled idx0, O: idx0 from signaled idx1).

TABLE 7

Table 7 is another mapping between $idx_0$ and $idx_1$

|  |  | $idx_0$ | | | | |
|---|---|---|---|---|---|---|
|  |  | 0 | 1 | 2 | 3 | 4 |
| $idx_1$ | 0 | / | X | O |  |  |
|  | 1 | X | / | X | O |  |
|  | 2 | O |  | / | X |  |
|  | 3 |  | O |  | / | X |
|  | 4 |  |  | O |  | / |

(X: $idx_1$ from signaled $idx_0$, O: $idx_0$ from signaled $idx_1$).

In this example, the same derivation process is applied whether it is $idx_0$ or $idx_1$ that is signaled. In that case, since two indices pairs are in common ((0,1) and (1,0)), when $idx_1$ is signaled, it is necessarily greater than 1. It is thus possible to signal $idx_1-2$ instead of $idx_1$.

As previously, any other mapping that associates a value to $idx_{1-x}$ depending on $idx_x$ except the same value of $idx_x$ is compatible with the present principles. According to another non-limiting example, a derivation process is half of $idx_x$ (0→1, 1→0, 2→1, 3→1, 4→2) as previously described for the first variant.

Table 7 illustrates another non-limiting example of a mapping that associates a value to $idx_{1-x}$ depending on $idx_x$ except the same value of $idx_x$ for both x cases. If the mapping has several indices pairs in common then $idx_1$-nb_common_pairs can be signaled instead of $idx_1$ (as in table 6 where pairs (0,1) and (1,0) are common and removed from signaling of $idx_1$).

Furthermore, by deriving one index $idx_{1-x}$ from the other $idx_x$, it reduces the maximum number of tested combinations at the encoder. It goes from 40 combinations (5*4*2, as described above in the limitation section) to only 16 ((5+3)*2) in the presented example and up to only 20 (5+5)*2=2*MaxNumTriangleMergeCand*2) with mappings without common pairs (as in Table 7). In any case, it reduces the number of tested combinations to less than half, thus the encoder complexity.

An example of amendments to VVC specification where the triangle partition signaling is involved (bold unchanged) is presented below (strikethrough for the removals and underline for the additions) for the variant mapping illustrated in table 6, the VVC version indented below and asterisks added where highlighted with bold in applicant's originally filed disclosure:

7.3.7.7 Merge data syntax

|  | Descriptor |
|---|---|
| merge_data( x0, y0, cbWidth, cbHeight ) { |  |
|   if ( CuPredMode[ x0 ][ y0 ] = = MODE_IBC ) { |  |
|     if( MaxNumMergeCand > 1 ) |  |
|       merge_idx[ x0 ][ y0 ] | ae(v) |
|   } else { |  |
| . . . | . . . |
|     } else { |  |
|       if( sps_ciip_enabled_flag && cu_skip_flag[ x0 ][ y0 ] = = 0 && |  |
|         ( cbWidth * cbHeight ) >= 64 && cbWidth < 128 && cbHeight < 128 ) { |  |
|         ciip_flag[ x0 ][ y0 ] | ae(v) |
|         if( ciip_flag[ x0 ][ y0 ] && MaxNumMergeCand > 1) |  |
|           merge_idx[ x0 ][ y0 ] | ae(v) |
|       * } |  |
|       if( MergeTriangleFlag[ x0 ][ y0 ]) { |  |
|         merge_triangle_split_dir[ x0 ][ y0 ] | ae(v) * |
| ** | |
|         merge_triangle_idx_num[ x0 ][ y0 ] | ae(v) |
|         merge_triangle_idx[ x0 ][ y0 ] | ae(v) ** |
|       } |  |
|       } |  |
|     } |  |
|   } |  |
|   } |  |
| } |  |

7.4.8.7 Merge data semantics

. . .

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

** merge_triangle_idx_num [x0][y0] specifies which merge_triangle_idx is to be decoded. The array indices x0, y0 specify the location (x0, y0) of the top-left luma sample of the considered coding block relative to the top-left luma sample of the picture.

When merge_triangle_idx_num [x0][y0] is not present, it is inferred to be equal to 0.

merge_triangle_idx[x0][y0] specifies the (merge_triangle_idx_num+1)-th merging candidate index of the triangular shape based motion compensation candidate list where x0, y0 specify the location (x0, y0) of the top-left luma sample of the considered coding block relative to the top-left luma sample of the picture.

When merge_triangle_idx[x0][y0] is not present, it is inferred to be equal to 0. **

[merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0. merge_triangle_idx$_1$[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.]]

. . .

8.5.4.2 Derivation process for luma motion vectors for merge triangle mode

The motion vectors mvA and mvB, the reference indices refIdxA and refIdxB and the prediction list flags predListFlagA and predListFlagB are derived by the following ordered steps:

1. The derivation process for luma motion vectors for merge mode as specified in clause 8.5.2.2 is invoked with the luma location (xCb, yCb), the variables cbWidth and cbHeight inputs, and the output being the luma motion vectors mvL[0][0], [0][0], the reference indices refIdxL0, refIdxL1, the prediction list utilization flags predFlagL0[0][0] and predFlagL1[0][0], the bi-prediction weight index bowIdx and the merging candidate list mergeCandList.

2. * The variables m and n, being the merge index for triangle partition 0 and 1 respectively, are derived using*  merge_triangle_idx_num [xCb][yCb] and merge_triangle_idx[xCb][yCb]  [merge_triangle_idx0[xCb][yCb] and merge_triangle_idx1[xCb][yCb]] as follows:

if(merge_triangle_*idx_num*[xCb][yCb]==1)m=0      (8-447)

n=merge_triangle_*idx*[xCb][yCb]+2(=*nb*_common-_pairs depending on the mapping)      (8-448)

otherwise m=merge_triangle_*idx*[xCb][yCb]      (8-449)

n=(m>0)?0:1      (8-450)

[m=merge_triangle_*idx*$_0$[xCb][yCb]      (8-447)

n=merge_triangle_*idx*1[xCb][yCb]+(merge_triangle_*idx*1[xCb][yCb]>=m)?1:0      (8-448)]]

3 . . .

TABLE 9-11

Syntax elements and associated binarizations
(where FL: Fixed-Length coding, TR: Truncated Rice coding, . . . )

| Syntax structure | Syntax element | Binarization Process | Input parameters |
|---|---|---|---|
| merge_data( ) . . . | | | |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | * merge_triangle_split_dir[ ][ ] | FL | cMax = 1 * |
| | ** merge_triangle_idx_num[ ][ ] | FL | cMax = 1 |
| | merge_triangle_idx[ ][ ] | TR | cMax = (merge_triangle_idx_num[ ][ ]) ? MaxNumTriangleMergeCand − 3(= 1+nb_common_*pairs depending on the mapping*) : MaxNumTriangleMergeCand − 1, cRiceParam = 0 ** |
| | merge_idx[ ][ ] | TR | cMax = MaxNumMergeCand − 1, cRiceParam = 0 |

TABLE 9-17

Assignment of ctxInc to syntax elements with context coded bins
(where bypass stands for no contexts and equiprobability)

| Syntax element | binIdx | | | | | |
|---|---|---|---|---|---|---|
| | 0 | 1 | 2 | 3 | 4 | >=5 |
| ... | ... | ... | ... | ... | ... | ... |
| merge_idx[ ][ ] | 0 | bypass | bypass | bypass | bypass | na |
| * merge_triangle_split_dir [ ][ ] | bypass | na | na | na | na | na * |
| ** merge_triangle_idx_num [ ][ ] | 0 | na | na | na | na | na |
| merge_triangle_idx[ ][ ] | 0 | bypass | bypass | bypass | bypass | na ** |
| ... | ... | ... | ... | ... | ... | ... |

Third Variant: Increasing Index Dynamics

In a third variant, at least one embodiment comprises extending the signaled index. Accordingly, at least one main embodiment of a method for signaling triangle partition for Inter prediction comprises signaling an extended index in a list of uni-prediction candidates and deriving a first and a second index of a uni-prediction candidate from the signaled extended index. According to a particular feature, the extension of the dynamic is based on MaxNumTriangleMergeCand. According to another particular feature, the extension of the dynamic is in the range [0 to (MaxNumTriangleMergeCand*(MaxNumTriangleMergeCand 1))−MaxNumTriangleMergeCand].

In both first and second variant embodiments, numerous tested combinations are removed. In order to keep some of them while still removing one signaled index, it is advantageous to extend the dynamics of the signaled index.

The following non-limiting example illustrates the index dynamics extension combined with the first variant, but all described extension can also be applied to the second variant. In others words a range of the merging candidate index is larger than the range of the triangular shape based motion compensation candidate list and less than twice the range of the triangular shape based motion compensation candidate list.

One example extension of the index dynamics can be, as described in Table 10, with an $idx_0$ extended by size of MaxNumTriangleMergeCand−2 (here 5−2=3):
  (i) If $idx_0$ is 0, then $idx_1$ is set to 1 (as in the first variant),
  (ii) If $idx_0$ is greater than 0 and less than 5, then $idx_1$ is set to 0 (as in the first variant),
  (iii) If $idx_0$ is greater than 4, then $idx_0$ is set to $idx_0-5$ and $idx_1$ is set to $idx_0+2$ (added with extended index).

TABLE 10

Table 10 is a mapping between idx0 and idx1

| | | $idx_0$ | | | | | | | |
|---|---|---|---|---|---|---|---|---|---|
| | | 0 | 1 | 2 | 3 | 4 | 5 | 6 | 7 |
| $idx_1$ | 0 | 1 | X | X | X | X | / | | |
| | 1 | X | / | | | | | / | |
| | 2 | O | | / | | X | | | / |
| | 3 | O | | | / | | X | | X |
| | 4 | | O | | / | | | X | |

(X: signaled idx0, O: translated extended idx0)

Again, as previously, several other derivation processes are possible for extended index as any other mapping that associates $idx_0$ to a valid value and $idx_1$ to a value depending on $idx_0$ except the same value of $idx_0$.

The extended size can be any between 0 (equivalent to first variant) and 15 inclusive that reaches the maximum number of tested combinations (=(5*4)−5=(MaxNumTriangleMergeCand*(MaxNumTriangleMergeCand−1))−MaxNumTriangleMergeCand). Moreover, this extended size must depend on the maximum number of $Cand_x$ (MaxNumTriangleMergeCand) to be flexible with this signaled maximum.

An example of amendments to VVC specification where the triangle partition signaling is involved (bold unchanged) is presented below compared to first variant (common parts are not presented) (strikethrough for the removals and underline for the additions), and asterisks added where highlighted in applicant's originally filed disclosure with bold:

8.5.4.2 Derivation process for luma motion vectors for merge triangle mode

...

The motion vectors mvA and mvB, the reference indices refIdxA and refIdxB and the prediction list flags predListFlagA and predListFlagB are derived by the following ordered steps:
1. The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the bi-prediction weight index bowIdx and the merging candidate list mergeCandList.
2. * The variables m and n, being the merge index for triangle partition 0 and 1 respectively, are derived using merge_triangle_idx0[xCb][yCb][[and merge_triangle_idx1[xCb][yCb]] as follows: *

**$m$=merge_triangle_$idx$0[$xCb$][$yCb$]−(merge_triangle_$idx_0$[$xCb$][$yCb$]>=MaxNum TriangleMergeCand)?MaxNumTriangleMergeCand:0     (8-447)

$n$=(merge_triangle_$idx$0[$xCb$][$yCb$]>=MaxNumTriangleMergeCand)?$m$+2:($m$>0)?0:1     (8-448)**

[$m$=merge_triangle_$idx$0[$xCb$][$yCb$]     (8-447)

$n$=merge_triangle_$idx$1[$xCb$][$yCb$]+(merge_triangle_$idx$1[$xCb$][$yCb$]>=$m$)?1:0     (8-448)]]

3 ...

TABLE 9-11

Syntax elements and associated binarizations
(where FL: Fixed-Length coding, TR: Truncated Rice coding, . . . )

| Syntax structure | Syntax element | Binarization Process | Input parameters |
|---|---|---|---|
| merge_data( ) . . . | | . . . | . . . |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | * merge_triangle_split_dir[ ][ ] | FL | cMax = 1 * |
| | ** merge_triangle_idx_num[ ][ ] | FL | cMax = 1 |
| | merge_triangle_idx[ ][ ] | TR | cMax = (merge_triangle_idx_num[ ][ ]) ? MaxNumTriangleMergeCand − 3(= 1+nb_common_pairs depending on the mapping) : MaxNumTriangleMergeCand − 1, cRiceParam = 0 ** |
| | merge_idx[ ][ ] | TR | cMax = MaxNumMergeCand − 1, cRiceParam = 0 |

TABLE 9-17

Assignment of ctxInc to syntax elements with context coded bins
(where bypass stands for no contexts and equiprobability)

| | binIdx | | | | | |
|---|---|---|---|---|---|---|
| Syntax element | 0 | 1 | 2 | 3 | 4 | >=5 |
| . . . | . . . | . . . | . . . | . . . | . . . | . . . |
| merge_idx[ ][ ] | 0 | bypass | bypass | bypass | bypass | na |
| * merge_triangle_split_dir[ ][ ] | bypass | na | na | na | na | na |
| merge_triangle_idx0[ ][ ] | 0 | bypass | bypass | bypass | bypass * | bypass ** |
| . . . | . . . | . . . | . . . | . . . | . . . | . . . |

Fourth Variant: Increasing Index Dynamics

In a fourth variant, at least one embodiment comprises replacing all signaling by one single index representing the splitting direction and the triangle merge candidate indices. Accordingly, at least one main embodiment of a method for signaling triangle partition for Inter prediction comprises signaling a generalized index representative of a triangle split direction, a first and a second index of a uni-prediction candidate from a list of uni-prediction candidates.

In the fourth variant embodiment, the previous third variant embodiment is generalized to any combination of indexes and split direction using a signaled index that maps to a combination of split direction and merge indices. An example of mapping is depicted in Table 13.

TABLE 13

Table 13 is a mapping signaled index and triangle combination.

| | | split direction | $idx_0$ | $idx_1$ |
|---|---|---|---|---|
| signaled index | 0 | / | 0 | 1 |
| | 1 | / | 1 | 0 |
| | 2 | \ | 0 | 1 |
| | 3 | \ | 1 | 0 |
| | 4 | / | 0 | 2 |
| | 5 | / | 2 | 0 |
| | 6 | \ | 0 | 2 |
| | 7 | \ | 2 | 0 |
| | 8 | / | 1 | 2 |

TABLE 13-continued

Table 13 is a mapping signaled index and triangle combination.

| | split direction | $idx_0$ | $idx_1$ |
|---|---|---|---|
| 9 | / | 2 | 1 |
| 10 | \ | 1 | 2 |
| 11 | \ | 2 | 1 |
| 12 | / | 0 | 3 |
| 13 | / | 3 | 0 |
| 14 | \ | 0 | 3 |
| 15 | \ | 3 | 0 |

Again, as previously, several other derivation processes are possible for mapping signaled index to $idx_0$, $idx_1$ and split direction.

The skilled in the art will un-ambiguously, derive this variant for GPM where an index in a table is already used to signal both angle and distance of the slanted boundary. An extended table may further define the merging candidate indices.

An example of amendments to VVC specification where the triangle partition signaling is involved (bold) is presented below compared to the first variant (strikethrough for the removals and underline for the additions) and asterisks added where highlighted with bold in applicant's originally filed disclosure:

| 7.3.7.7 Merge data syntax | |
|---|---|
| | Descriptor |
| merge_data( x0, y0, cbWidth, cbHeight ) { | |
|   if(CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
| . . . | . . . |
|     } else { | |
|       if( sps_ciip_enabled_flag && cu_skip_flag[ x0 ][ y0 ] = = 0 && | |
|         ( cbWidth * cbHeight) >= 64 && cbWidth < 128 && cbHeight < 128 | |
| ) | |
| { | |
|         ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|       } | |
|       * if( MergeTriangleFlag[ x0 ][ y0 ] ) { | |
|         merge_triangle_split_dir[ x0 ][ y0 ] | ae(v) |
|         merge_triangle_idx_num [ x0 ][ y0 ] | ae(v) * |
|       } | |
|     } | |
|   } | |
| } | |

7.4.8.7 Merge data semantics

. . .

** merge_triangle_idx[x0][y0] specifies the combination of merging candidate index and splitting direction of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0. **

[[merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx$_1$[x0][y0] is not present, it is inferred to be equal to 0.]]

. . .

8.5.4.2 Derivation process for luma motion vectors for merge triangle mode

. . .

The motion vectors mvA and mvB, the reference indices refIdxA and refIdxB and the prediction list flags predListFlagA and predListFlagB are derived by the following ordered steps:

1. The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the bi-prediction weight index bcwIdx and the merging candidate list mergeCandList.

2. * The variables m and n, being the merge index for triangle partition 0 and 1 respectively, are derived using *  merge_triangle_idx[xCb][yCb]  [merge_triangle_idx0[xCb][yCb] and merge_triangle_idx1[xCb][yCb]] as follows:

**merge_triangle_split_dir=signaled_merge_triangle_split_dir
  [merge_triangle_*idx*[*xCb*][*yCb*]]   (8-447)

$m$=merge_triangle_*idx*0[merge_triangle_*idx*[*xCb*]
  [*yCb*]]   (8-448)

$n$=merge_triangle_*idx*1[merge_triangle_*idx*[*xCb*]
  [*yCb*]]   (8-449)**

[$m$=merge_triangle_*idx*0[*xCb*][*yCb*]   (8-447)

$n$=merge_triangle_*idx*1[*xCb*][*yCb*]+(merge_triangle_*idx*1[*xCb*][*yCb*]>=$m$)?1:0   (8-448)]]

3 . . .

TABLE 9-11

Syntax elements and associated binarizations
(where FL: Fixed-Length coding, TR: Truncated Rice coding, . . . )

| Syntax structure | Syntax element | Binarization Process | Input parameters |
|---|---|---|---|
| merge_data( ) . . . | | . . . | . . . |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | * merge_triangle_split_dir[ ][ ] | FL | cMax = 1 * |
| | ** merge_triangle_idx_num[ ][ ] | FL | cMax = 1 |
| | merge_triangle_idx[ ][ ] | TR | cMax = (merge_triangle_idx_num[ ][ ]) ? MaxNumTriangleMergeCand − 3(= 1+nb_common_pairs depending on the mapping) : MaxNumTriangleMergeCand − 1, cRiceParam = 0 ** |
| | merge_idx[ ][ ] | TR | cMax = MaxNumMergeCand − 1, cRiceParam = 0 |

TABLE 9-17

Assignment of ctxInc to syntax elements with context coded bins
(where bypass stands for no contexts and equiprobability)

| Syntax element | binIdx 0 | 1 | 2 | 3 | 4 | >=5 |
|---|---|---|---|---|---|---|
| . . . | . . . | . . . | . . . | . . . | . . . | . . . |
| merge_idx[ ][ ] | 0 | bypass | bypass | bypass | bypass | na |
| ** merge_triangle_idx [ ][ ] | 0 | bypass | bypass | bypass | bypass | bypass ** |
| . . . | . . . | . . . | . . . | . . . | . . . | . . . |

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 7:
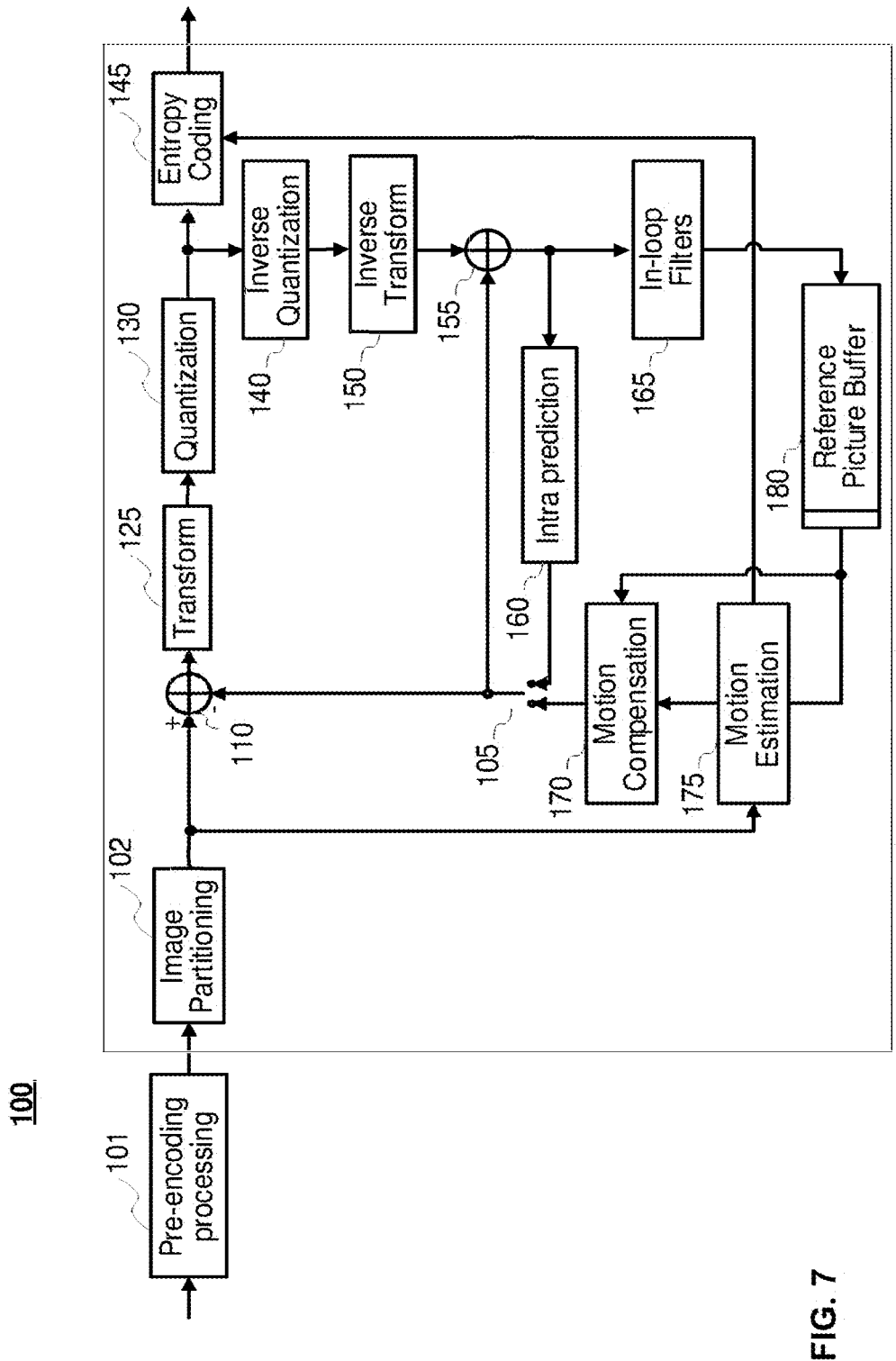
FIG. 7 illustrates a block diagram of an embodiment of video encoder in which various aspects of the embodiments may be implemented.
Figure 8:
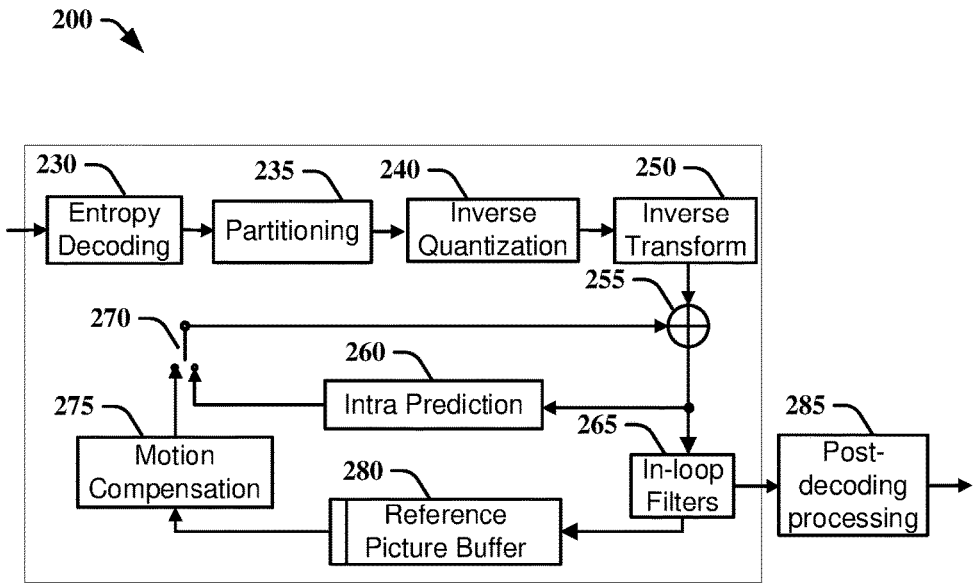
FIG. 8 illustrates a block diagram of an embodiment of video encoder in which various aspects of the embodiments may be implemented.
Figure 9:
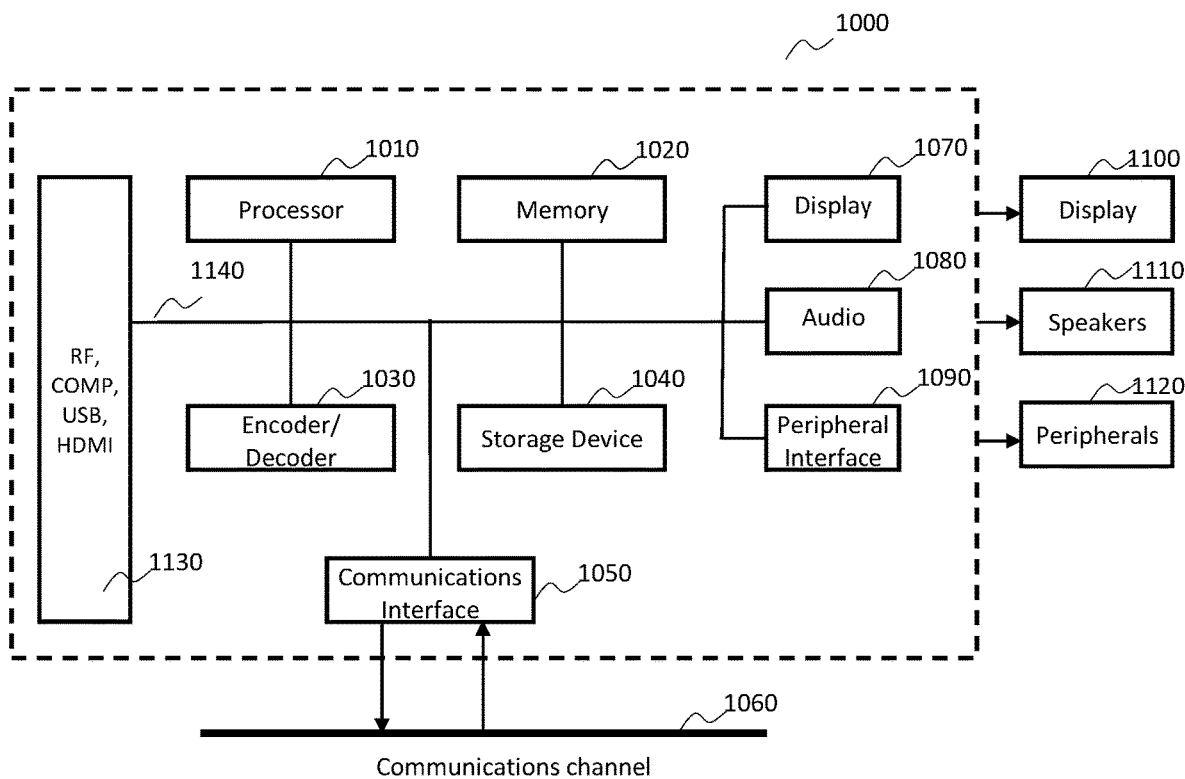
FIG. 9 illustrates a block diagram of an example apparatus in which various aspects of the embodiments may be implemented.

The aspects described and contemplated in this application can be implemented in many different forms. FIGS. 7, 8 and 9 below provide some embodiments, but other embodiments are contemplated and the discussion of FIGS. 7, 8 and 9 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation modules (170, 275), of a video encoder 100 and decoder 200 as shown in FIG. 7 and FIG. 8. Moreover, the present aspects are not limited to VVC or HEVC, and can be applied, for example, to other standards and recommendations, whether pre-existing or future-developed, and extensions of any such standards and recommendations (including WVC and HEVC). Unless indicated otherwise, or technically precluded, the aspects described in this application can be used individually or in combination.

Various numeric values are used in the present application, for example, the number of maximum triangle partition mode candidates. The specific values are for example purposes and the aspects described are not limited to these specific values.

FIG. 7 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 8 illustrates a block diagram of a video decoder 200. In the decoder 200, a bitstream is decoded by the decoder elements as described below. Video decoder 200 generally performs a decoding pass reciprocal to the encoding pass as described in FIG. 7. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 9 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 9, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, motion-compensated prediction using triangle partition mode wherein at least one merging candidate index in the triangular shape based motion compensation candidate list is derived from a signaled syntax element.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, motion-compensated prediction using triangle partition mode wherein at least one merging candidate index in the triangular shape based motion compensation candidate list is derived from a signaled syntax element.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, merge_triangle_idx_num [x0][y0], merge_triangle_idx[x0][y0], are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. Advantageously, the disclosed signaling covering a subset of possible pairs of the triangular shape based motion compensation candidate list provide such faster approach. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of mapping function for deriving at least one merging candidate index in the triangular shape based motion compensation candidate list. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the signaling of triangle partition for Inter prediction process applied in the decoder and/or encoder.

Encoding/Decoding a video comprising signaling of triangle partition for Inter prediction according to any of the disclosed methods.

Inserting in the signaling, a syntax element representative of an index in a triangular shape based motion compensation candidates list.

Deriving at least one merging candidate index in the triangular shape based motion compensation candidates list from a signaled syntax element representative of an index in a triangular shape based motion compensation candidates list.

Inserting in the signaling, a syntax element representative of a first index of a uni-prediction candidate in a list of uni-prediction candidates and deriving a second index of a uni-prediction candidate from the first index.

Inserting in the signaling, a flag indicating which index is signaled and a syntax element representative of a first index of a uni-prediction candidate in a list of uni-prediction candidates and deriving a second index of a uni-prediction candidate from the first index.

Inserting in the signaling, a syntax element representative of an extended index of a uni-prediction candidate in a list of uni-prediction candidates and deriving a second index of a uni-prediction candidate from the first index.

Inserting in the signaling, a syntax element representative of a generalized index coding a split direction, a first and a second index of a uni-prediction candidate from a list of uni-prediction candidates.

Inserting in the signaling, syntax elements that enable the decoder to identify the triangle partitions (TPM) derivation process to use.

A mapping function to use in a derivation of the triangle partitions comprising n=(m>0)? 0:1 where n is the derived index and m is the signaled index.

A mapping function to use in a derivation of the triangle partitions comprising n=(m=0)? 1: $\lfloor m/2 \rfloor$ where n is the derived index and m is the signaled index.

Applying the mapping function for deriving the triangular shape based motion compensation candidates to use for Inter prediction the at the decoder.

A bitstream or signal that includes one or more of the described syntax elements, or variations thereof.

A bitstream or signal that includes syntax conveying information generated according to any of the embodiments described.

Inserting in the signaling syntax elements that enable the decoder to perform triangular shape based motion compensation in a manner corresponding to that used by an encoder.

Inserting in the signaling, syntax elements that enable the decoder to use the TPM derivation in a manner corresponding to that used by an encoder, in a slice/tile header indicating that all Luma CUs in the slice/tile use this TPM derivation method.

Inserting in the signaling, syntax elements that enable the decoder to use the TPM derivation in a manner corresponding to that used by an encoder, in the Picture Parameter Set (PPS) indicating that all Luma CUs in a frame use this TPM derivation method.

Inserting in the signaling, syntax elements that enable the decoder to use the TPM derivation in a manner corresponding to that used by an encoder, in the Sequence Parameter Set (SPS) indicating that all Luma CUs in the sequence use this TPM derivation method.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs TPM derivation according to any of the embodiments described.

A TV, set-top box, cell phone, tablet, or other electronic device that performs TPM derivation according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs TPM derivation parameters according to any of the embodiments described.

A TV, set-top box, cell phone, tablet, or other electronic device that receives (e.g. using an antenna) a signal over the air that includes an encoded image, and performs TPM derivation according to any of the embodiments described.

The invention claimed is:

1. A method for decoding, comprising:
decoding a syntax element representative of a first merging candidate index of a triangular shape based motion compensation candidates list;
if a number of candidates in the triangular shape based motion compensation candidates list is larger than 2, then a signaling of a second merging candidate index in the triangular shape based motion compensation candidates list is skipped and a second merging candidate index in the triangular shape based motion compensation candidates list is derived from the first merging candidate index using a mapping function; and
decoding a block of a picture by performing a triangular shape based motion compensation using motion information of a merging candidate at a position indicated by the first merging candidate index in the triangular shape based motion compensation candidates list and of a merging candidate at a position indicated by the second merging candidate index in the triangular shape based motion compensation candidates list.

2. The method of claim 1, wherein a syntax element indicates to which index in the triangular shape based motion compensation candidates list the first merging candidate index corresponds.

3. The method of claim 1, wherein the mapping function sets the second merging candidate index to one if the first merging candidate index is equal to zero, else sets the second merging candidate index to zero.

4. The method of claim 1, wherein the mapping function sets the second merging candidate index to one if the first merging candidate index is equal to zero, else sets the second merging candidate index to half the first merging candidate index.

5. The method of claim 1, wherein the first merging candidate index of a triangular shape based motion compensation candidates list further indicates one of a split direction of a diagonal boundary or an angle and a distance of a slanted boundary.

6. An apparatus for decoding, comprising one or more processors, wherein the one or more processors are configured for:
decoding a syntax element representative of a first merging candidate index of a triangular shape based motion compensation candidates list;
if a number of candidates in the triangular shape based motion compensation candidates list is larger than 2, then a signaling of a second merging candidate index in the triangular shape based motion compensation candidates list is skipped and deriving a second merging candidate index in the triangular shape based motion compensation candidates list is derived from the first merging candidate index using a mapping function; and decoding a block of a picture by performing a triangular shape based motion compensation using motion information of a merging candidate at a position indicated by the first merging candidate index in the triangular shape based motion compensation candidates list and of a merging candidate at a position indicated by the second merging candidate index in the triangular shape based motion compensation candidates list.

7. The apparatus of claim 6, wherein a syntax element indicates to which index in the triangular shape based motion compensation candidates list the first merging candidate index corresponds.

8. The apparatus of claim 6, wherein the mapping function sets the second merging candidate index is set to one if the first merging candidate index is equal to zero, else sets the second merging candidate index is set to zero.

9. The apparatus of claim 6, wherein the mapping function sets the second merging candidate index is set to one if the first merging candidate index is equal to zero, else sets the second merging candidate index is set to half the first merging candidate index.

10. The apparatus of claim 6, wherein the first merging candidate index of a triangular shape based motion compensation candidates list further indicates one of a split direction of a diagonal boundary or an angle and a distance of a slanted boundary.

11. A method for encoding, comprising:

if a number of candidates in the triangular shape based motion compensation candidates list is larger than 2, then determining a first merging candidate index of a triangular shape based motion compensation candidates list, wherein a signaling of a second merging candidate index in the triangular shape based motion compensation candidates list is skipped and wherein the first merging candidate index enables deriving the second merging candidate index in the triangular shape based motion compensation candidates list using a mapping function;

encoding a block of a picture by performing a triangular shape based motion compensation using motion information of a merging candidate at a position indicated by the first merging candidate index in the triangular shape based motion compensation candidates list and of a merging candidate at a position indicated by the second merging candidate index in the triangular shape based motion compensation candidates list; and encoding a syntax element representative of the first merging candidate index of a triangular shape based motion compensation candidates list.

12. The method of claim 11, wherein a syntax element indicates to which index in the triangular shape based motion compensation candidates list the first merging candidate index corresponds.

13. The method of claim 11, wherein the mapping function sets the second merging candidate index to one if the first merging candidate index is equal to zero, else sets the second merging candidate index to zero.

14. The method of claim 11, wherein the mapping function sets the second merging candidate index is set to one if the first merging candidate index is equal to zero, else sets the second merging candidate index to half the first merging candidate index.

15. An apparatus for encoding, comprising one or more processors, wherein the one or more processors are configured for:

if a number of candidates in the triangular shape based motion compensation candidates list is larger than 2, then determining a first merging candidate index of a triangular shape based motion compensation candidates list, wherein a signaling of a second merging candidate index in the triangular shape based motion compensation candidates list is skipped and wherein the first merging candidate index enables deriving the second merging candidate index in the triangular shape based motion compensation candidates list using a mapping function;

encoding a block of a picture by performing a triangular shape based motion compensation using motion information of a merging candidate at a position indicated by the first merging candidate index in the triangular shape based motion compensation candidates list and of a merging candidate at a position indicated by the second merging candidate index in the triangular shape based motion compensation candidates list; and encoding a syntax element representative of the first merging candidate index of a triangular shape based motion compensation candidates list.

16. The apparatus of claim 15, wherein a syntax element indicates to which index in the triangular shape based motion compensation candidates list the first merging candidate index corresponds.

17. The apparatus of claim 15, wherein the mapping function sets the second merging candidate index is set to one if the first merging candidate index is equal to zero, else sets the second merging candidate index is set to zero.

18. The apparatus of claim 15, wherein the mapping function sets the second merging candidate index to one if the first merging candidate index is equal to zero, else sets the second merging candidate index to half the first merging candidate index.

19. A non-transitory computer readable medium storing data content generated according to the encoding method of claim 11.

20. A non-transitory computer readable medium storing software code instructions for performing the method according to claim 1 when the instructions are executed by a processor.

* * * * *